(12) United States Patent
Okada

(10) Patent No.: US 7,882,937 B2
(45) Date of Patent: Feb. 8, 2011

(54) ELEVATING MACHINE CONTROL APPARATUS

(75) Inventor: Takao Okada, Hikone (JP)

(73) Assignee: Fujitec Co., Ltd., Shiga (JP)

( * ) Notice: Subject to any disclaimer, the term of this patent is extended or adjusted under 35 U.S.C. 154(b) by 659 days.

(21) Appl. No.: 11/911,266

(22) PCT Filed: Mar. 13, 2006

(86) PCT No.: PCT/JP2006/305333

§ 371 (c)(1),
(2), (4) Date: Oct. 11, 2007

(87) PCT Pub. No.: WO2006/109415

PCT Pub. Date: Oct. 19, 2006

(65) Prior Publication Data

US 2009/0058333 A1 Mar. 5, 2009

(30) Foreign Application Priority Data

Apr. 11, 2005 (JP) .............................. 2005-113814

(51) Int. Cl.
*B66B 1/28* (2006.01)
(52) U.S. Cl. ....................... 187/296; 187/293; 187/297; 318/380
(58) Field of Classification Search ................. 187/293, 187/296, 297; 318/380
See application file for complete search history.

(56) References Cited

U.S. PATENT DOCUMENTS 4,667,776 A * 5/1987 Nomura ...................... 187/289
2001/0017235 A1 8/2001 Suga et al.
2004/0035646 A1 * 2/2004 Araki ......................... 187/290

FOREIGN PATENT DOCUMENTS

| JP | 5-26968 U | | 4/1993 |
| JP | 05137367 A | * | 6/1993 |
| JP | 7-303395 A | | 11/1995 |
| JP | 8-157152 A | | 6/1996 |
| JP | 9-2753 A | | 1/1997 |

(Continued)

OTHER PUBLICATIONS

Machine translation of JP 2002-120973 A.*

(Continued)

*Primary Examiner*—Walter Benson
*Assistant Examiner*—Kawing Chan
(74) *Attorney, Agent, or Firm*—Westerman, Hattori, Daniels & Adrian, LLP

(57) ABSTRACT

An elevating machine control apparatus controls an inverter (4) to drive an AC motor (5) connected to the inverter (4) with AC power, and energizes a power generation braking resistor (13) to apply a brake during regenerative operation of the AC motor (5). The apparatus prohibits the elevating machine from starting operating and interrupts power supply to the power generation braking resistor (13) if the DC stage voltage of the inverter (4) has a ripple quantity of a set value or more when the elevating machine is being stopped. Alternatively, the apparatus commands the elevating machine to stop operating and interrupts power supply to the power generation braking resistor (13) if the DC stage voltage of the inverter (4) during regenerative operation is a reference value or less when the elevating machine is in operation.

8 Claims, 5 Drawing Sheets

FOREIGN PATENT DOCUMENTS

| | | | |
|---|---|---|---|
| JP | 11-199148 | A | 7/1999 |
| JP | 2002-120973 | A | 4/2002 |
| JP | 2002-191178 | A | 7/2002 |
| JP | 3369890 | B2 | 11/2002 |
| JP | 2004112929 | A * | 4/2004 |
| JP | 2005-45914 | A | 2/2005 |
| JP | 2005229771 | A * | 8/2005 |
| JP | 2006262616 | A * | 9/2006 |

OTHER PUBLICATIONS

Machine translation of JP 8-157152 A.*
International Search Report of PCT/JP2006/305333, date of mailing Jul. 4, 2006.

* cited by examiner

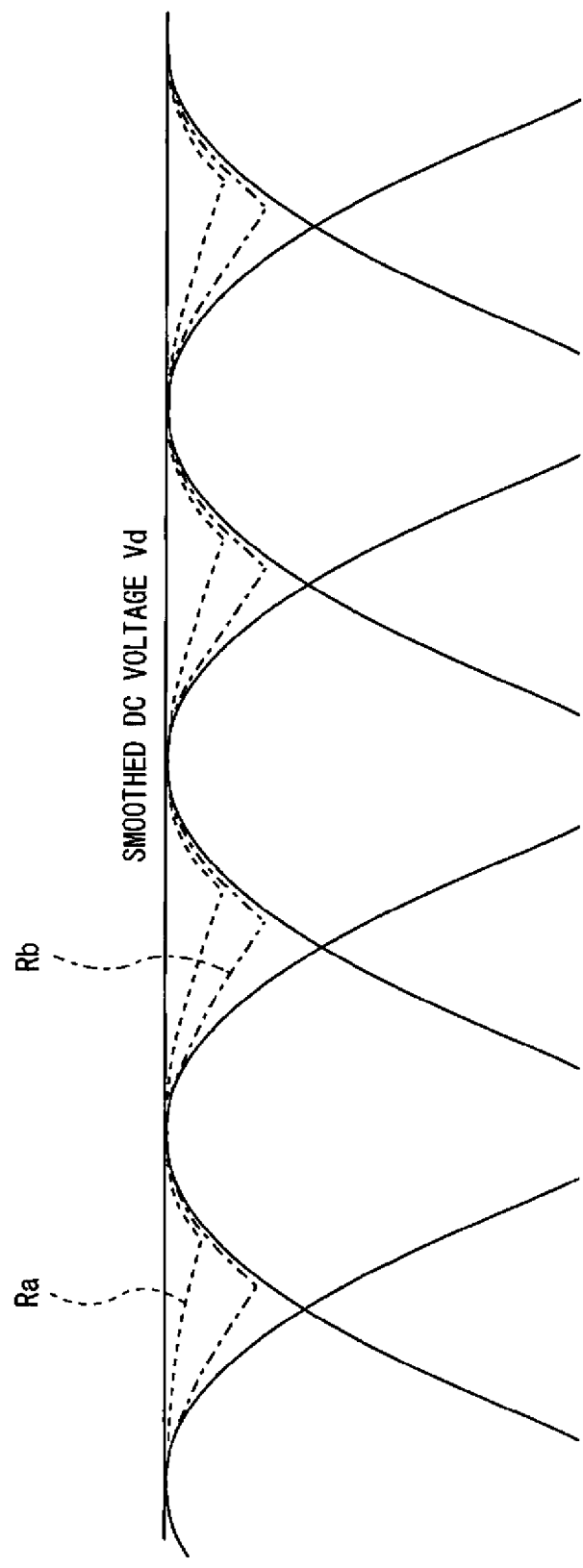

ELEVATING MACHINE CONTROL APPARATUS

TECHNICAL FIELD

The present invention relates to a control apparatus that drives an elevating machine such as an elevator or escalator.

BACKGROUND ART

As shown in FIG. 3, an elevator conventionally includes an elevator cage 10 tied to a balance weight 11 with a rope wound around a sheave 9. An AC motor 5 drives the sheave 9 to hoist the elevator cage 10. The illustrated control apparatus drives the AC motor 5. In the control apparatus, a three-phase alternating current from a commercial power supply 1 is full-wave rectified by a rectifier circuit 2, and converted to a direct current by a smoothing capacitor 3 further absorbing its ripple component. This converted direct current is converted by an inverter 4 to an alternating current of predetermined frequency, and input into the AC motor 5. The inverter 4 includes a plurality of semiconductor devices. A torque command from a controller 6 is input into a drive circuit 7, and the drive circuit 7 controls the conduction width (period for which a semiconductor device is on in the process of repeatedly being on (conduction)/off (interruption)) of the semiconductor devices of the inverter 4.

Regenerative energy during regenerative operation of the elevator is to be consumed by a heat dissipation circuit including a regenerating semiconductor device 12 and a power generation braking resistor 13. Specifically, during regenerative operation, the regenerating semiconductor device 12 repeatedly turns on/off in accordance with commands from the drive circuit 7, and in that process the conduction width is controlled depending on the magnitude of the regenerative energy, so that the regenerative energy will be consumed by the power generation braking resistor 13 generating heat.

If a failure of the regenerating semiconductor device 12 remaining on and not returning off, i.e. an on failure occurs, then the power generation braking resistor 13 can be overheated and cause a fire. Accordingly, in order to detect an occurrence of on failure, various safety measures have been proposed such as checking the energization state of the power generating braking resistor with a temperature sensor or the like (JP 3369890, B), checking the collector voltage of the transistor used as a regenerating semiconductor device (JP 2002-191178, A), and checking the synchronism of the base signal and collector signal of the transistor (JP 11-199148, A).

However, because all of the approaches are to detect an occurrence of on failure using hardware, there has been a problem in that the additional provision of hardware makes the device configuration complicated and also increases the cost.

Accordingly, an object of the present invention is to provide an elevating machine control apparatus configured to detect an on failure of the regenerating semiconductor device without addition of new hardware and give an appropriate safety precaution.

DISCLOSURE OF THE INVENTION

The present invention provides an elevating machine control apparatus including an inverter controlled according to a torque command provided from a difference signal between a predetermined speed command signal and a speed signal corresponding to an actual traveling speed, an AC motor connected to the inverter and driven by an AC power of variable voltage and variable frequency, and a power generation braking resistor energized to apply a brake during by on/off control of a regenerating semiconductor device during regenerative operation of the AC motor, wherein the apparatus determines that the regenerating semiconductor device is in failure when it is detected that the DC stage voltage of the inverter has a ripple quantity of a set value or more while the elevating machine is being stopped, and prohibits the elevating machine from starting operating and interrupts power supply to the power generation braking resistor.

Alternatively, in the present invention, the apparatus determines that the regenerating semiconductor device is in failure when it is detected that the DC stage voltage of the inverter during regenerative operation is a reference value or less while the elevating machine is in operation, and commands the elevating machine to stop operating and interrupts power supply to the power generation braking resistor.

Alternatively, in the present invention, the apparatus determines that the regenerating semiconductor device is in failure when it is detected that the DC stage voltage of the inverter has a ripple quantity of a set value or more while the elevating machine is being stopped, and prohibits the elevating machine from starting operating and interrupts power supply to the power generation braking resistor, and determines that the regenerating semiconductor device is in failure when it is detected that the DC stage voltage of the inverter during regenerative operation is a reference value or less while the elevating machine is in operation, and commands the elevating machine to stop operating and interrupts power supply to the power generation braking resistor.

Alternatively, in the present invention, the apparatus prohibits the elevating machine from starting operating and interrupts power supply to the power generation braking resistor if the DC stage voltage of the inverter has a ripple quantity of a set value or more while the elevating machine is being stopped, and commands the elevating machine to stop operating and interrupts power supply to the power generation braking resistor if the DC stage voltage of the inverter during regenerative operation is a reference value or less while the elevating machine is in operation.

The decision that a regenerative operation is performed is made by detecting by calculation that the regenerative electric power is a predetermined value or more.

The elevating machine control apparatus of the present invention can extremely easily detect an on failure of the regenerating semiconductor device only by software without addition of a special device. The power generation braking resistor can be therefore prevented from being overheated at extremely low costs by incorporating the software in the control circuit for the inverter control.

BRIEF DESCRIPTION OF THE DRAWINGS

FIG. 5 is a waveform diagram illustrating ripples generated in the DC stage voltage of the inverter.

BEST MODE FOR CARRYING OUT THE INVENTION

Figure 1:
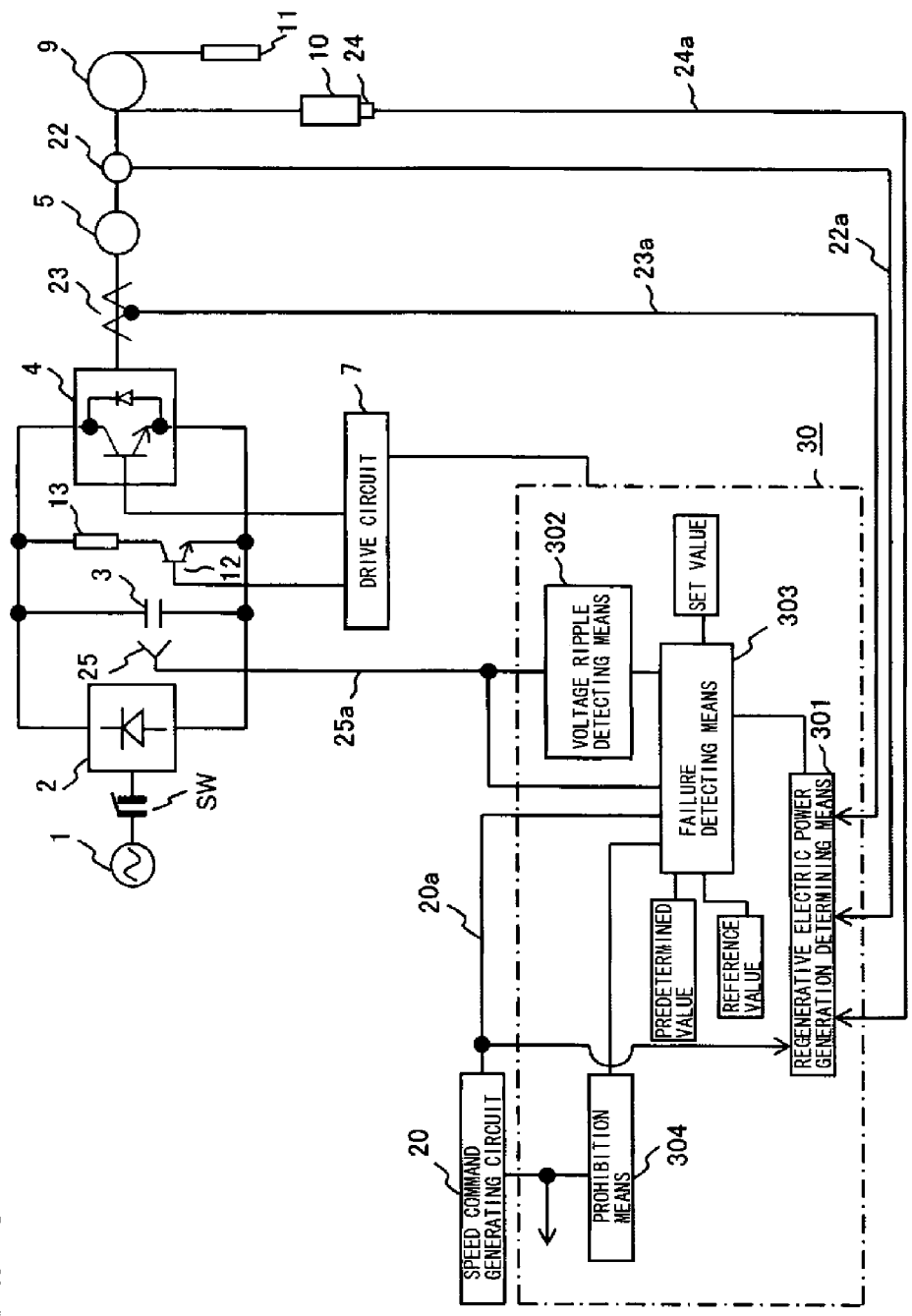
FIG. 1 is a block diagram showing a configuration of an elevator control apparatus of the present invention.
Figure 3:
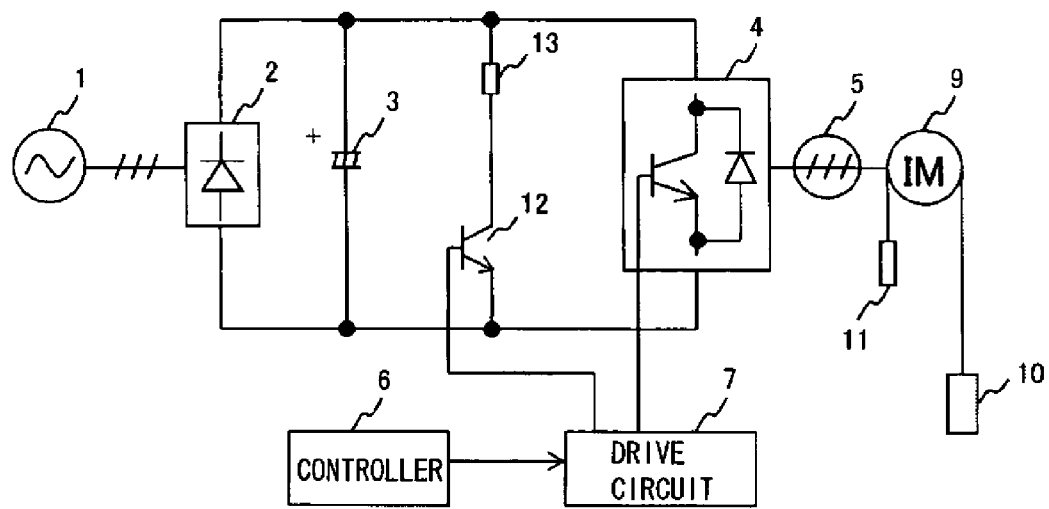
FIG. 3 is a block diagram showing a configuration of a conventional elevator control apparatus.

An elevator control apparatus embodying the present invention will be specifically described below with reference to the drawings. In FIG. 1, the same components as in FIG. 3 are provided with the same reference numerals as in FIG. 3.

As shown in FIG. 1, a three-phase alternating current from a commercial power supply 1 is input into a rectifier circuit 2 through a power supply interrupting electromagnetic contactor SW, full-wave rectified by the rectifier circuit 2, and converted to a direct current by a smoothing capacitor 3 further absorbing its ripple component. This converted direct current is converted by an inverter 4 to an alternating current of predetermined frequency, and input into an AC motor 5. A torque command from a controller 30 including a microcomputer is input into a drive circuit 7, and the drive circuit 7 controls the conduction width of a semiconductor device included in the inverter 4.

A heat dissipation circuit including a regenerating semiconductor device 12 and a power generation braking resistor 13 is connected to the DC stage of the inverter 4. The heat dissipation circuit consumes regenerative energy during regeneration operation of the elevator.

The controller 30 receives a speed command signal 20a given from a speed command generating circuit 20, a speed signal 22a output from a speed detector 22, a current detection signal 23a output from a current detector 23 for detecting the output current of the inverter 4, a weighted signal 24a output from a weight detector 24 attached to an elevator cage 10, and a voltage signal 25a output from a voltage detector 25 for detecting the voltage of the DC stage of the inverter 4. The controller 30 has a function of controlling the drive circuit 7 for the inverter 4 according to a torque command provided from a difference signal between the speed command signal 20a and the speed signal 22a. The control function is the same as a conventional one, and not described.

The controller 30 has a configuration for a safety precaution in the case where an on failure occurs in the regenerating semiconductor device 12. The configuration is realized by software as described below. The configuration can be divided by function into blocks including a regenerative electric power generation determining means 301, a voltage ripple detecting means 302, a failure detecting means 303, and a prohibition means 304. The regenerative electric power generation determining means 301 is to determine whether regenerative electric power is generated based on the speed command signal 20a, speed signal 22a, current detection signal 23a and weighted signal 24a. The voltage ripple detecting means 302 is to detect an occurrence of ripple in the inverter DC stage voltage based on the voltage signal 25a. The failure detecting means 303 is to detect an on failure of the regenerating semiconductor device 12 when a ripple occurs using a predetermined value, set value and reference value described below. The prohibition means 304 is to prohibit the elevator from starting operating when the regenerating semiconductor device 12 is in on failure.

Figure 2:
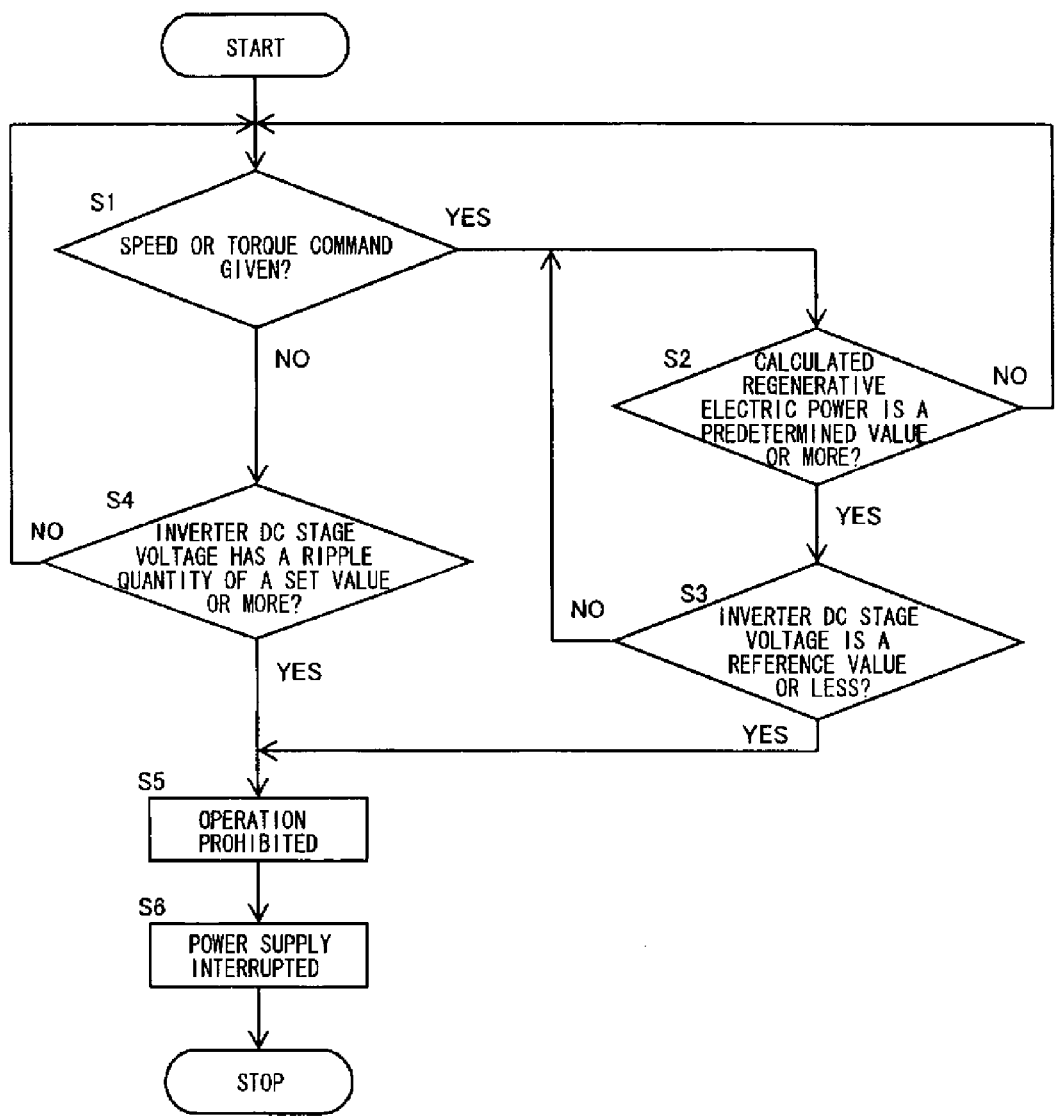
FIG. 2 is a flow chart showing operations of the control apparatus.

FIG. 2 shows a specific procedure of the controller 30 for detection of an on failure of the regenerating semiconductor device 12 and a safety precaution based on the result. The procedure includes an on failure detection section during stoppage of the elevator cage, an on failure detection section during the elevator operation, and a safety precaution section in the case where an on failure is detected.

As shown in FIG. 2, first in step S1, it is determined whether a speed command 20a (or torque command) is given or not to detect that the elevator cage is in operation or is being stopped. When a speed command 20a is not given and the elevator cage is being stopped, step S4 follows, where the voltage ripple detecting means 302 determines whether the DC stage voltage of the inverter has a ripple quantity of a set value or more to detect that an on failure occurs in the regenerating semiconductor device 12 or not.

Generally, the inverter DC stage voltage on no load is the maximum of the AC power supply line voltage, i.e. smoothed DC voltage Vd maintaining a peak (crest value) of the three-phase alternating current waveform as shown in FIG. 5, but, on load, has a ripple voltage Ra superimposed having a frequency six times of the AC power supply frequency, as shown by the broken line in FIG. 5.

If the regenerating semiconductor device 12 falls into on failure when the elevator is being stopped (when the inverter is not in operation) with no load generated, then a discharge current flows from the smoothing capacitor 3 through the power generation braking resistor 13 and regenerating semiconductor device 12, so that the DC stage voltage of the inverter will drop with a time constant determined by the capacitance value C of the smoothing capacitor 3 and the resistance value R of the power generation braking resistor 13, resulting in a large ripple Rb occurring as shown by the one-dot chain line in FIG. 5. That is to say, if the regenerating semiconductor device 12 falls into on failure when the elevator is being stopped, then the DC stage voltage of the inverter, which should be a smoothed DC voltage, periodically drops, so that a large ripple voltage will superimpose thereon. If the voltage of one phase of the three-phase alternating current of 200 V drops to 180 V, for example, the voltage further greatly drops with a ripple occurring. Accordingly, in step S4 of FIG. 2, an on failure is detected by detecting that the DC stage voltage has a ripple quantity of a set value or more.

When no on failure is detected, step S1 recurs to repeatedly determine whether the elevator is in operation or not. When an on failure is detected, step S5 follows, where the prohibition means 304 prohibits the elevator from starting operating. Then in step S6, the electromagnetic contactor SW is opened to interrupt power supply to the power generation braking resistor 13 and prevent the power generation braking resistor 13 from being overheated.

Figure 4:
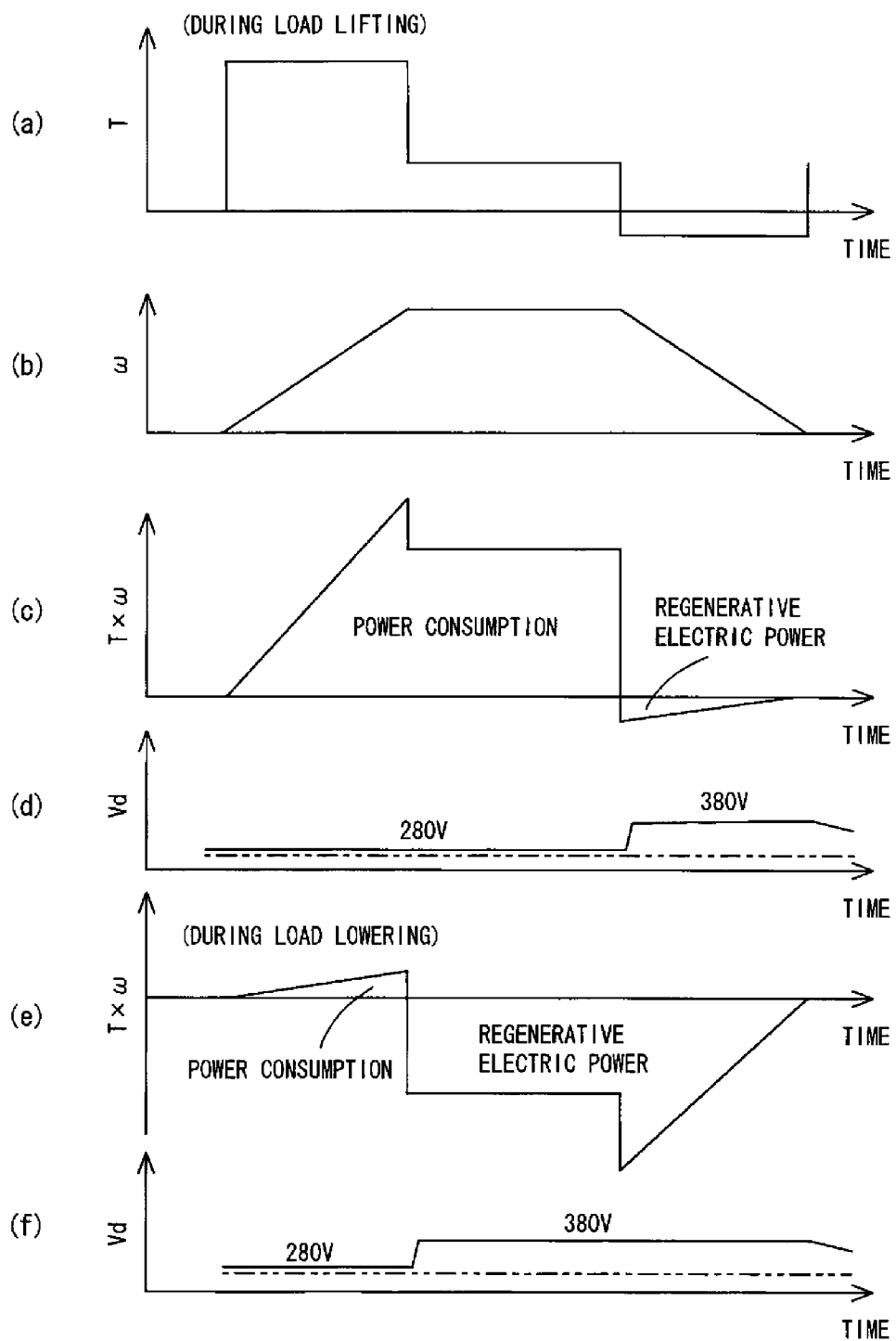
FIG. 4 includes waveform diagrams illustrating operations of the elevator control device of the present invention.

On the other hand, if the elevator cage is in operation, step S1 is answered yes, and then step S2 follows, where the regenerative electric power generation determining means 301 checks whether or not the calculated regenerative electric power is a predetermined value or more to determine whether a regenerative operation is being performed. The regenerative electric power can be calculated from internal information of the inverter, i.e. various items of information such as the torque command, speed, motor voltage, motor current, motor constant, generated torque, or motor revolution. For example, if during load lifting, the torque command T varies as shown in FIG. 4(a) and the motor revolution ω varies as shown in FIG. 4(b), then the power consumption and regenerative electric power of the motor can be found by the product (T×ω) of the torque command T and motor revolution ω, and vary as shown in FIG. 4(c). During load lowering, the power consumption and regenerative electric power vary as shown in FIG. 4(e). Accordingly, it can be determined that a regenerative operation is being performed by detecting that the regenerative electric power is a predetermined value or more. The regenerative electric power P can be found by the following formula from the measurements of the motor voltage Vm and motor current Im and the power factor θ of the motor in constant speed traveling during load lowering.

$$P = \sqrt{3} \cdot Vm \cdot Im \cdot \cos\theta$$

When it is determined in step S2 of FIG. 2 that the regenerative electric power is less than the predetermined value, step S1 recurs to repeatedly determine whether the elevator is in operation or not. When the regenerative electric power is the predetermined value or more and it is determined that a regenerative operation is being performed, step S3 follows, where the failure detecting means 303 determines whether or not the inverter DC stage voltage Vd is a reference value or less to determine whether the regenerating semiconductor device 12 is in on failure or not.

If the regenerating semiconductor device 12 is in on failure, then the inverter DC stage voltage is always less than the reference value, and therefore the failure can be determined. For example, in the case of the commercial voltage of 200 V, a full-wave rectified voltage is usually around 280 V, but if regenerative electric power is generated, the inverter DC stage voltage Vd will, as shown by the solid lines in FIGS. 4(d) and (f), rise to around 350 V to 380 V, which is higher than the full-wave rectified voltage of 280 V, because of electric power generated by the motor and operation of the inverter 4. However, if the regenerating semiconductor device 12 is in on failure, then the opposite ends of the smoothing capacitor 3 are short-circuited via the power generation braking resistor 13 and regenerating semiconductor device 12, and therefore the inverter DC stage voltage Vd does not rise from the full-wave rectified voltage of 280 V, as shown by the two-dot chain lines in FIGS. 4(d) and (f), for example, and does not reach to 350 V. Accordingly, the reference value is set to a value between 280 V and 350 V, so that an on failure occurrence can be determined by the fact that the inverter DC stage voltage Vd is the reference value or less.

When the regenerating semiconductor device 12 is not in on failure, step S2 of FIG. 2 recurs to repeatedly determine whether a regenerative operation is being performed or not. On the other hand, when the regenerating semiconductor device 12 is in on failure, and step S3 of FIG. 2 is answered yes, step S5 follows to output an elevator operation stop command through the prohibition means 304, and interrupt power supply to the power generation braking resistor 13 with the electromagnetic contactor SW to prevent the power generation braking resistor 13 from being overheated. In most cases, the regenerating semiconductor device 12 falls into on failure when in operation, and therefore failures can be quickly detected.

As described above, the elevator control apparatus of the present invention can detect an on failure of the regenerating semiconductor device with a simple configuration of only incorporating software for performing the procedure shown in FIG. 2, and therefore can prevent the power generation braking resistor from being overheated at extremely low costs.

In the described embodiment, failures are detected both when the elevator cage is in operation and being stopped to give respective safety precautions, but failure detection and safety precautions may be performed only in any one of the cases. This is because elevators alternately repeat operation and stoppage, so that practically satisfactory safety precautions can be provided even by failure detection only in any one of the cases if a malfunction is quickly detected and the safety precaution is carried out in the one case. Although in the described embodiment, it is determined that the elevator cage is in operation/being stopped depending on whether there is a speed command or not, as well as this, it may be determined depending on whether there is a torque command or not, or determined based on sequence information such as brake switching.

The invention claimed is:

1. An elevating machine control apparatus comprising an inverter controlled according to a torque command provided from a difference signal between a predetermined speed command signal and a speed signal corresponding to an actual traveling speed, an AC motor connected to the inverter and driven by an AC power of variable voltage and variable frequency, and a power generation braking resistor energized to apply a brake by on/off control of a regenerating semiconductor device during regenerative operation of the AC motor, wherein the elevating machine control apparatus determines that the regenerating semiconductor device is in failure when it is detected that the DC stage voltage of the inverter has a ripple quantity of a set value or more while the elevating machine is being stopped, and prohibits the elevating machine from starting operating and interrupts power supply to the power generation braking resistor.

2. An elevating machine control apparatus comprising an inverter controlled according to a torque command provided from a difference signal between a predetermined speed command signal and a speed signal corresponding to an actual traveling speed, an AC motor connected to the inverter and driven by an AC power of variable voltage and variable frequency, and a power generation braking resistor energized to apply a brake by on/off control of a regenerating semiconductor device during regenerative operation of the AC motor, wherein the elevating machine control apparatus determines that the regenerating semiconductor device is in failure when it is detected that the DC stage voltage of the inverter during regenerative operation is a reference value or less while the elevating machine is in operation, and commands the elevating machine to stop operating and interrupts power supply to the power generation braking resistor.

3. An elevating machine control apparatus comprising an inverter controlled according to a torque command provided from a difference signal between a predetermined speed command signal and a speed signal corresponding to an actual traveling speed, an AC motor connected to the inverter and driven by an AC power of variable voltage and variable frequency, and a power generation braking resistor energized to apply a brake by on/off control of a regenerating semiconductor device during regenerative operation of the AC motor, wherein the elevating machine control apparatus determines that the regenerating semiconductor device is in failure when it is detected that the DC stage voltage of the inverter has a ripple quantity of a set value or more while the elevating machine is being stopped, and prohibits the elevating machine from starting operating and interrupts power supply to the power generation braking resistor, and determines that the regenerating semiconductor device is in failure when it is detected that the DC stage voltage of the inverter during regenerative operation is a reference value or less while the elevating machine is in operation, and commands the elevating machine to stop operating and interrupts power supply to the power generation braking resistor.

4. The elevating machine control apparatus according to any one of claims 1 to 3, wherein the regenerating semiconductor device is connected to the power generation braking resistor in series, and the power generation braking resistor and the regenerating semiconductor device form a heat dissipation circuit to consume regenerative energy during regenerative operation.

5. The elevating machine control apparatus according to any one of claims 1 to 3, wherein the decision that a regenerative operation is performed is made by detecting that the regenerative electric power is a predetermined value or more.

6. The elevating machine control apparatus according to claim 2 or 3, wherein the reference value is set to a voltage value greater than the crest value of a commercial power supply supplied to the inverter, and smaller than a predetermined DC stage voltage during normal regenerative operation.

7. The elevating machine control apparatus according to any one of claims 1 to 3, wherein the regenerative electric power is calculated from a torque command value and a cage speed signal.

8. The elevating machine control apparatus according to any one of claims 1 to 3, wherein the regenerative electric power is calculated from the motor voltage and motor current.

* * * * *